(12) United States Patent
Schmidt et al.

(10) Patent No.: US 6,290,389 B2
(45) Date of Patent: Sep. 18, 2001

(54) DEVICE FOR TEMPERATURE MEASUREMENT

(75) Inventors: Volker Schmidt, Berlin (DE); William Menchine, Santa Cruz, CA (US); Hans-Jurgen Rostalski, Berlin; Frank Wyrowski, Jena, both of (DE)

(73) Assignee: Raytek GmbH, Berlin (DE)

( * ) Notice: Subject to any disclaimer, the term of this patent is extended or adjusted under 35 U.S.C. 154(b) by 0 days.

(21) Appl. No.: 09/766,449

(22) Filed: Jan. 19, 2001

Related U.S. Application Data

(63) Continuation of application No. 08/836,369, filed as application No. PCT/EP96/03330 on Jul. 29, 1996.

(30) Foreign Application Priority Data

Aug. 3, 1995  (DE) .............................................. 195 28 590

(51) Int. Cl.$^7$ .................. G01K 1/00; G01J 5/02
(52) U.S. Cl. .................. 374/121; 374/141; 33/DIG. 21; 362/259; 250/491.1; 356/399
(58) Field of Search .................. 374/120, 121, 374/124, 141, 208; 33/241, DIG. 21; 362/35, 259; 356/49, 399; 250/491.1

(56) References Cited

U.S. PATENT DOCUMENTS

| | | | |
|---|---|---|---|
| 4,315,150 | * 2/1982 | Darringer et al. | 250/338.1 |
| 4,576,432 | * 3/1986 | Ruger | 374/124 |
| 4,626,686 | 12/1986 | Pompei et al. | |
| 5,085,525 | 2/1992 | Bartosiak et al. | |
| 5,090,789 | 2/1992 | Crabtree | |
| 5,172,978 | 12/1992 | Nomura et al. | |
| 5,368,392 | * 11/1994 | Hollander et al. | 374/121 |
| 5,524,984 | 6/1996 | Hollander et al. | |
| 5,626,424 | * 5/1997 | Litvin et al. | 374/121 |
| 5,727,880 | * 3/1998 | Hollander et al. | 374/121 |
| 5,836,694 | * 11/1998 | Nguyen | 374/130 |
| 5,839,829 | * 11/1998 | Litvin et al. | 374/121 |
| 6,183,129 | * 2/2001 | Aoyama et al. | 374/121 |
| 6,196,714 | * 3/2001 | Bellifemine et al. | 374/121 |

FOREIGN PATENT DOCUMENTS

| | | | |
|---|---|---|---|
| 32 13 955 | * 4/1982 | (DE) | 374/121 |
| 37 10486 C1 | 8/1988 | (DE) | |
| 0 458 200 B1 | 7/1994 | (EP) | |
| 2203537 | * 10/1966 | (GB) | |
| 57-22521 | * 2/1982 | (JP) | 374/121 |
| 62-12848 | * 2/1982 | (JP) | 374/121 |

OTHER PUBLICATIONS

The Optometrics Group, Transmission Grating Beamsplitters, pp. 60,61, 1993.*

Patricia Mokry: "Unique Applications of Computer–Generated Diffractive Optical Elements", Polaroid Corporation, Optical Engineering, Cambridge MA 02139 (1989).

Thomas K Gaylord, etal: "Analysis and Applications of Optical Diffraction by Gratings" *Proceedings of the IEEE*, vol. 73(5) pp. 894–937; May 1995.

* cited by examiner

Primary Examiner—Andrew H. Hirshfeld
(74) Attorney, Agent, or Firm—Townsend and Townsend and Crew LLP

(57) ABSTRACT

The invention relates to a device for temperature measurement. The heat radiation emanating from a measurement spot on an object of measurement is imaged by an optical system onto a detector. A sighting arrangement is also provided which has a diffractive optical system by which a light intensity distribution is produced which corresponds to the position and size of the measurement spot on the object of measurement.

1 Claim, 6 Drawing Sheets

DEVICE FOR TEMPERATURE MEASUREMENT

CROSS REFERENCE TO RELATED APPLICATIONS

This application is a continuation of and claims priority from U.S. application Ser. No. 08/836,369, filed Oct. 20, 1997, the disclosure of which is incorporated herein by reference.

BACKGROUND OF THE INVENTION

Device For Temperature Measurement

The invention relates to a device for temperature measurement.

Such devices which are known in the art for contactless temperature measurement comprise a detector for receiving heat radiation emanating from a measurement spot on an object of measurement, an optical system for imaging the heat radiation emanating from the measurement spot onto the detector and a sighting arrangement for identifying the position and size of the measurement spot on the object of measurement by means of visible light. A further processing arrangement which converts the detector signal into a temperature indication is also connected to the detector.

In this case the optical system is so designed that at a certain measurement distance for the most part only heat radiation from a certain area of the object of measurement, namely the so-called measurement spot, is focussed onto the detector. In most cases the size of the measurement spot is defined by the area from which 90% of the heat rays focussed onto the detector strike. However, applications are also known in which there are reference to values between 50% and 100%.

The pattern of the dependence of the size of the measurement spot upon the measurement distance depends upon the design of the optical system. A fundamental distinction is made between distant focussing and close focussing. In distant focussing the optical system images the detector into infinity and in close focussing it images it onto the focus plane. In the case of distant focussing it is necessary to deal with a measurement spot which grows linearly with the measurement distance, whereas in close focussing the measurement spot will first of all become smaller with the measurement distance and after the focus plane will enlarge again if the free aperture of the optical system is greater than the measurement spot in the focus plane. If the measurement spot in the focus plane is greater than the free aperture of the optical system, then the measurement spot is also enlarged with the measurement distance even before the focus plane. Only the increase in the size of the measurement spot is smaller before the focus plane than after it.

In the past various attempts were made to render the position and size of the measurement spot, which is invisible per se, visible by illumination. According to JP-A-47-22521 a plurality of rays which originate from several light sources or are obtained by reflection from a light source are directed along the marginal rays of a close-focussed optical system onto the object of measurement. In this way the size and position of the measurement spot for a close-focussed system can be rendered visible by an annular arrangement of illuminated points around the measurement spot. U.S. Pat. No. 5,368,392 describes various methods of outlining measurement spots by laser beams. These include the mechanical deflection of one or several laser beams as well as the splitting of a laser beam by a beam divider or a fibre optic system into several single beams which surround the measurement spot.

A sighting system is also known in the art which uses two laser beams to describe the size of the measurement spot. This system uses two divergent beams emanating from the edge of the optical system to characterise a close-focussed system and two laser beams which intersect in the focus point to characterise a close-focussed optical system.

All known sighting arrangements are either only useful for a certain measurement distance or require relatively complex adjustment and are often quite expensive.

SUMMARY OF THE INVENTION

The object of the invention, therefore, is to make further developments to the device for temperature measurement in such a way as to facilitate simple identification of the position and size of the measurement spot independently of the distance.

This object is achieved according to one aspect of the invention, in that the sighting arrangement has a diffractive optical system for producing a light intensity distribution with which the position and size of the measurement spot on the object of measuremnent can he rendered visible.

According to another aspect of the invention, a diffractive optical system is an optical element, the function of which is based principally upon the diffraction or light waves. In order to produce the diffraction, transverse microstructures which can consist, for example, of a surface profile or a refractive index profile are provided in the optical element. Diffractive optical elements with a surface profile are also known as so-called holographic elements. The surface patterns are produced for example by exposure of photoresist layers to light and subsequent etching. Such a surface profile can also be converted by electroplating into an embossing, printing block with which the hologram profile can be transferred into heated plastic films and reproduced. Thus many holographic elements can be produced economically from one hologram printing block.

The pattern of the diffractive optical system is produced by interference of an object wave with a reference wave. If for example a spherical wave is used as the object wave and a plane wave as the reference wave then an intensity distribution is produced in the image plane which is composed of a point in the centre (0th order), a first intensive circle (first order) and further less intensive circle of greater diameter (higher orders). By screening out of the 0th and the higher orders an individual circle can be filtered out. A plurality of other intensity distributions which are explained in greater detail below with reference to several embodiments can be produced by other object waves.

According to another aspect of the invention, usually approximately 80% of the energy emanating from the light source lies in the patterns produced by the diffractive optical system. The remaining energy is distributed inside and outside the measurement spot.

According to a further aspect of the invention, the light intensity distribution which is produced can be formed, for example, by a circular marking surrounding the measurement spot or a cross-shaped marking.

Such a device can also be produced economically and only requires a little adjustment work.

Further constructions of the invention are the subject of the subordinate claims and are explained in greater detail below with reference to the description of several embodiments and to the drawings.

DETAILED DESCRIPTION OF THE PREFERRED EMBODIMENTS

Figure 1:
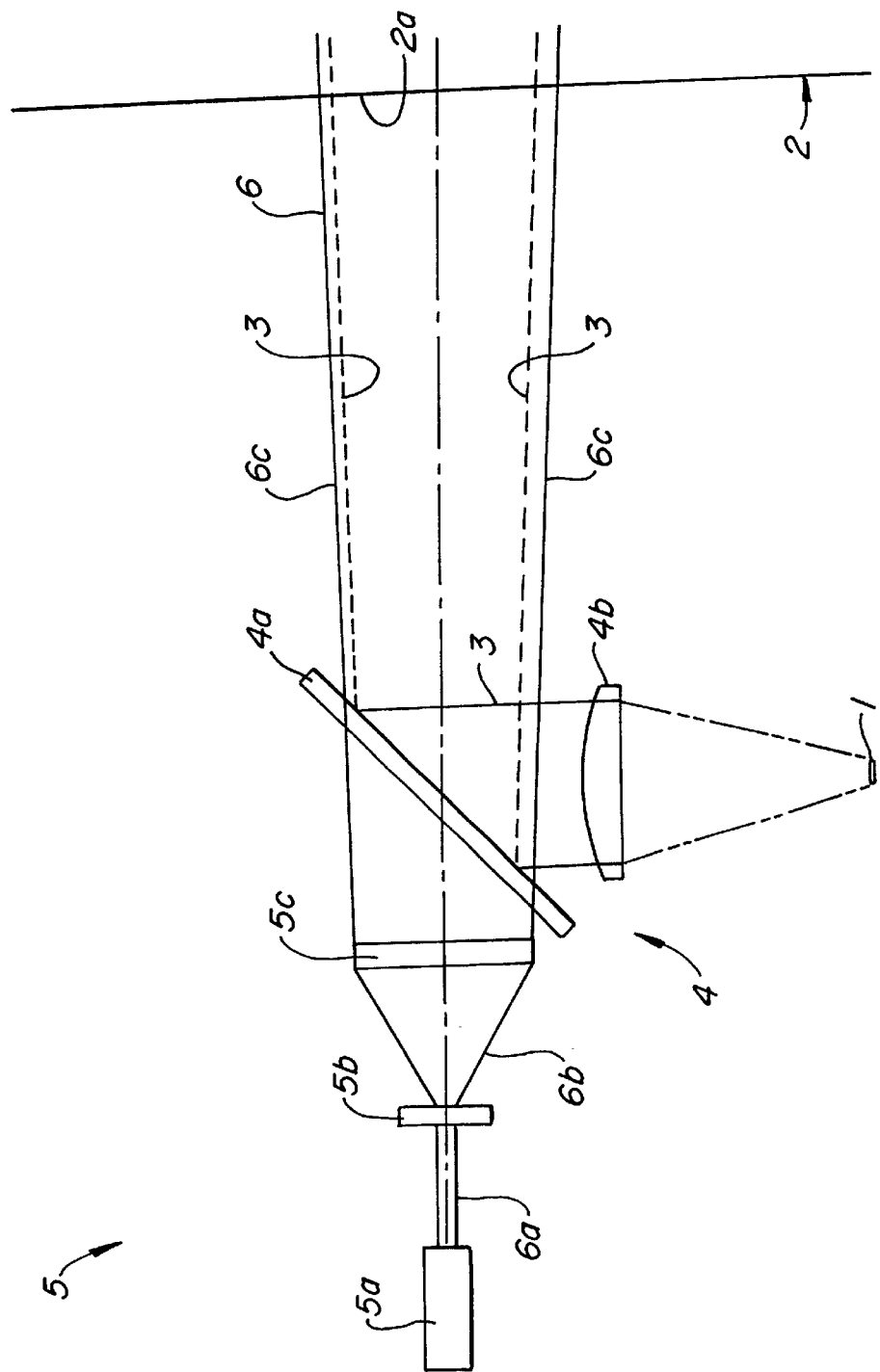
FIG. 1 shows a schematic representation of a device according to the invention for temperature measurement according to a first embodiment.

FIG. 1 shows a first embodiment of a device according to the invention for temperature measurement, comprising (a) a detector 1 for receiving heat radiation 3 emanating from a measurement spot 2a of an object of measurement 2, (b) an optical system 4 for imaging the heat radiation emanating from the measurement spot 2a onto the detector 1.

c) and a sighting arrangement 5 for identifying the position and size of the measurement spot 2a on the object of measurement 2 by means of visible light 6.

The sighting arrangement 5 consists essentially of a light source 5a, a diffractive optical system formed for example by a holographic element 5b and an additional refracting and/or reflecting optical element 5c. The light source 5a sends a reference wave 6a onto the holographic element 5b, resulting in a conically opening hologram 6b which is transformed by the optical element 5c so that it forms an intensity distribution 6c which describes the position and size of the measurement spot 2a over all measurement distances.

A laser is advantageously used as the light source 5a for generating the reference wave. However, it is also possible to use a semiconductor light-emitting diode or a thermal light source. When a thermal light source is used a filter is advantageously provided in order to reduce the chromatic aberrations.

The optical system 4 is formed by a dichroic beam divider 4a and an infrared lens 4b. The heat radiation 3 emanating from the measurement spot 2a first of all reaches the beam divider 4a which deflects the heat radiation, i.e., the infrared radiation, by 90° and delivers it to the infrared lens 4b.

Since the beam divider 4a must of necessity lie in the beam path of the sighting arrangement 5 it is constructed as a dichromatic beam divider which is reflective for the heat radiation emanating from the measurement spot 2a and transparent for the visible light of the sighting arrangement 5.

The size of the marking, to be produced depends essentially upon two parameters, namely the measurement distance and the desired accuracy of measurement. The accuracy of measurement results from the percentage of the rays emanating from the measurement spot and focussed onto the detector. The area of the measurement spot can for example be defined by the fact that 90% of the emanating radiation reaches the detector. However, depending upon the application this percentage can also be changed.

The optical element 5c which is adapted to the optical system 4 is provided in order to ensure that in each measurement distance the marking produced for identifying the measurement spot has the correct size for the desired accuracy or measurement.

FIGS. 2a to 2g show light intensity distributions such as might be produced on the object of measurement 2 for identifying the measurement spot 2a. FIGS. 2a to 2d show annular markings which substantially outline the measurement spot 2a. In this case the markings can be configured as in FIGS. 2a and 2c as a closed circle 3a of in FIGS. 2b and 2d as a broken circle 3b. It may also be advantageous to represent the centre of the measurement spot by a further marking 3c, for example in the form of a dot.

Figure 2A:
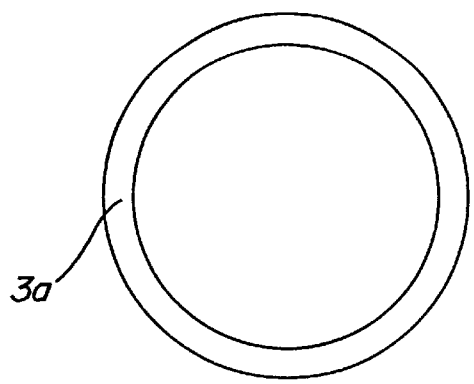
FIGS. 2a to 2g show schematic representations of various light intensity distributions for identifying the position and size of the measurement spot.
Figure 2B:
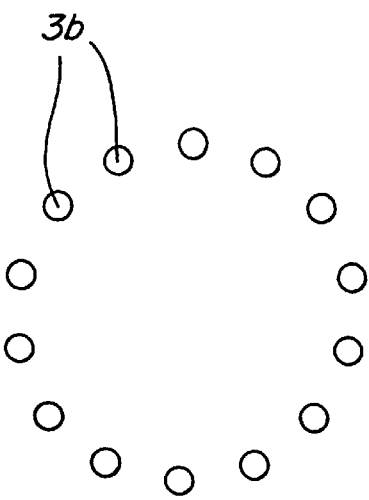
Figure 2C:
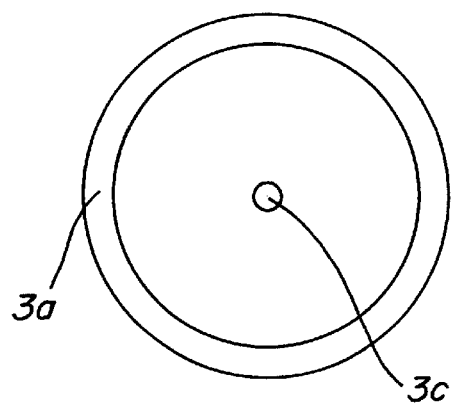
Figure 2D:
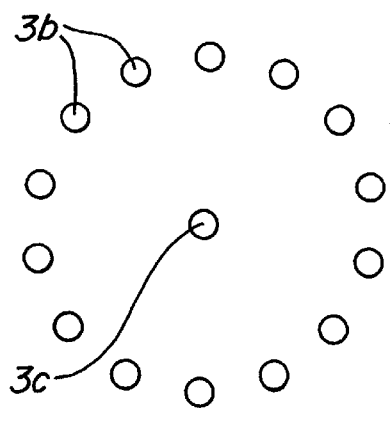
Figure 2E:
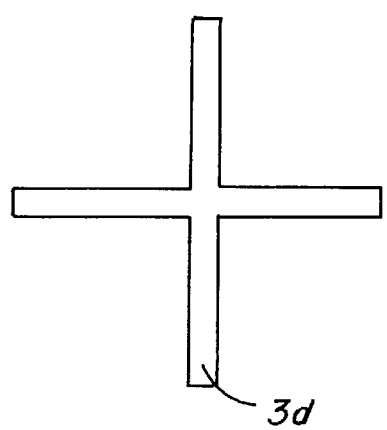
Figure 2F:
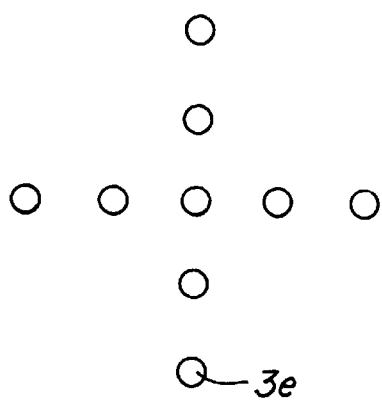

In FIGS. 2e and 2f the light intensity distributions are represented as cross-shaped markings 3d and 3e respectively. In this case the point of intersection represents the centre of the measurement spot 2a and the four corner points represent the outer limits thereof.

Figure 2G:
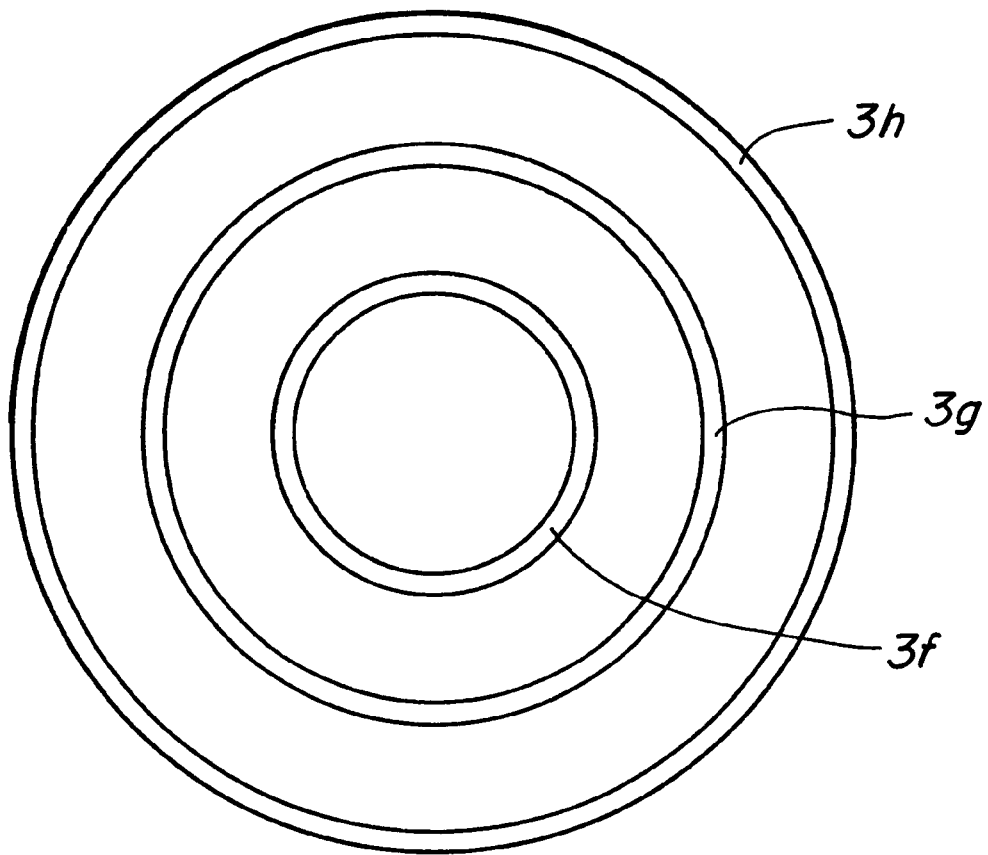

A very advantageous light intensity distribution is represented in FIG. 2g in the form of a plurality of concentric circles 3f, 3a, 3h. In this case each circle represents a region of the measurement spot 2a from which a certain percentage of the energy of the received heat radiation originates. Thus for example the inner circle 3f could represent the region of the measurement spot from which 90% of the energy striking the detector originates. The second ring 3g represents an energy value of 95% and the third ring 3h would correspond to an energy value of 99%. With the aid of such a light intensity distribution the user can recognise the level of accuracy with which he can measure objects of a certain size.

Figure 3:
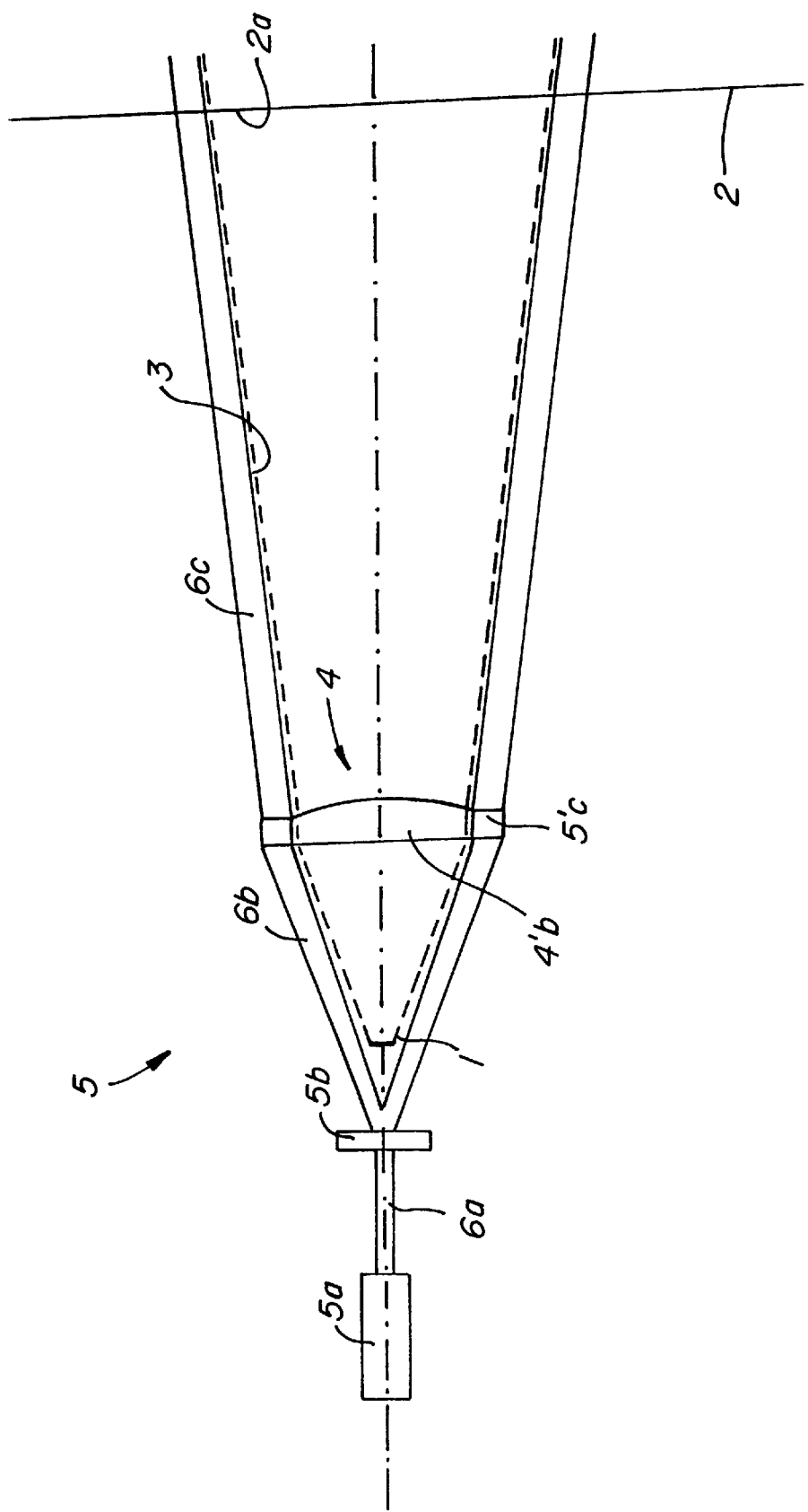
FIG. 3 shows a schematic representation or a device according to the invention for temperature measurement according to a second embodiment.

A further device according to the invention for temperature measurement is represented in FIG. 3. The same reference numerals are used in this case for the same components. This second embodiment differs from the first one essentially in the design of the optical system 4 and the optical element 5'c of the sighting arrangement 5. In FIG. 3 the optical element 5'c is constructed as an annular lens and accordingly is designed to produce a light intensity distribution according to FIGS. 2a to 2d. The infrared lens 4'b is arranged so that it is surrounded by the annular lens 5'c. The detector 1 is then provided between the holographic element 5b and the infrared lens 4'b.

Such an arrangement has the advantage that a beam divider can be omitted. However, a somewhat more complicated fixing of the detector must be accepted, since the conically opening hologram 6b must not be restricted thereby.

Figure 4:
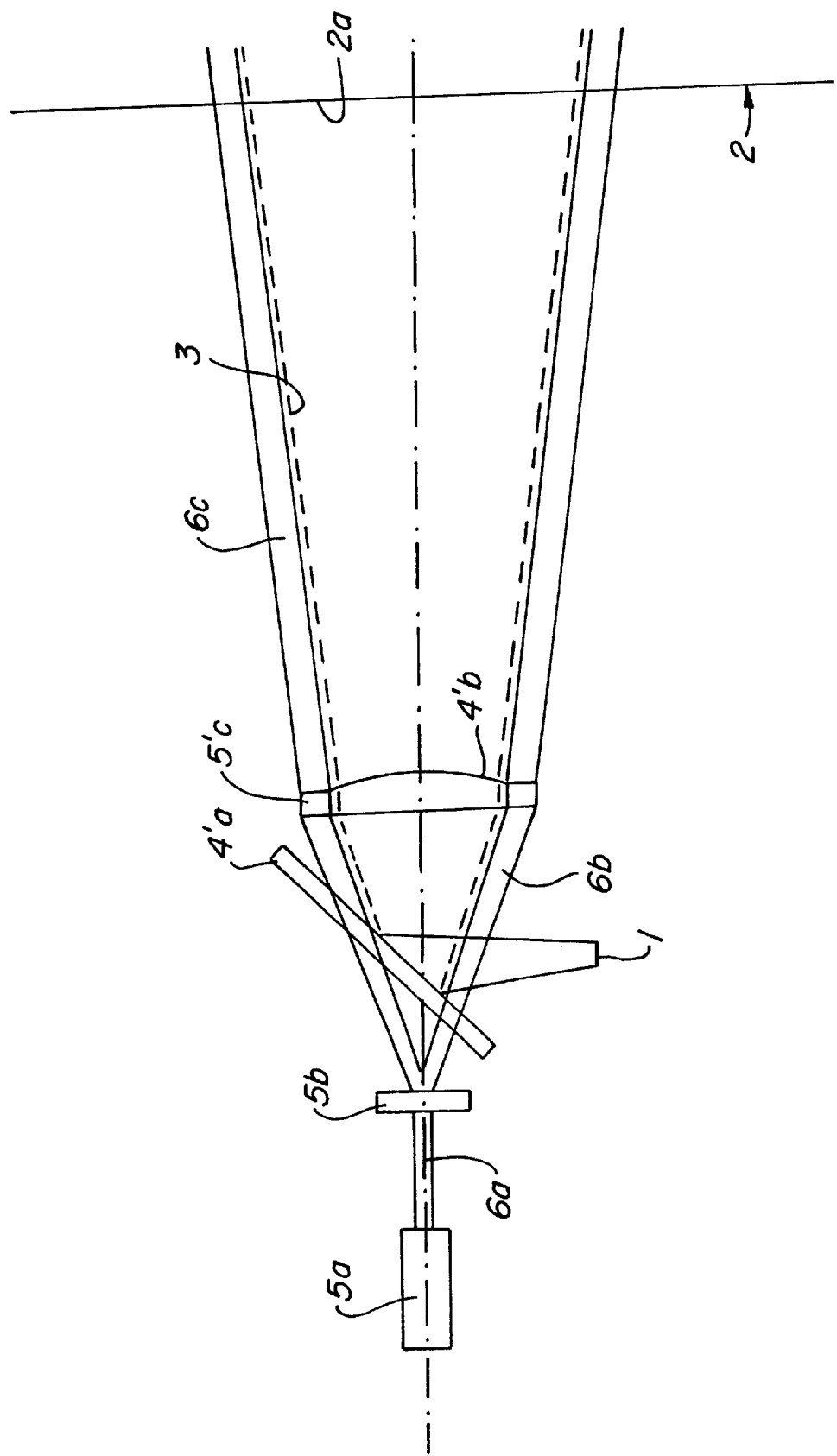
FIG. 4 shows a schematic representation of a device according to the invention for temperature measurement according to a third embodiment.

In the third embodiment illustrated in FIG. 4 the problem of mounting the detector 1 is circumvented by providing, the beam divider 4'a between the holographic element 5b and the arrangement consisting of the annular lens 5c and the infrared lens 4'b. Thus the heat radiation emanating from the measurement spot 2a is focussed first of all by the infrared lens 4'b onto the beam divider 4'a and is there deflected by 90° onto the detector 1.

Figure 5:
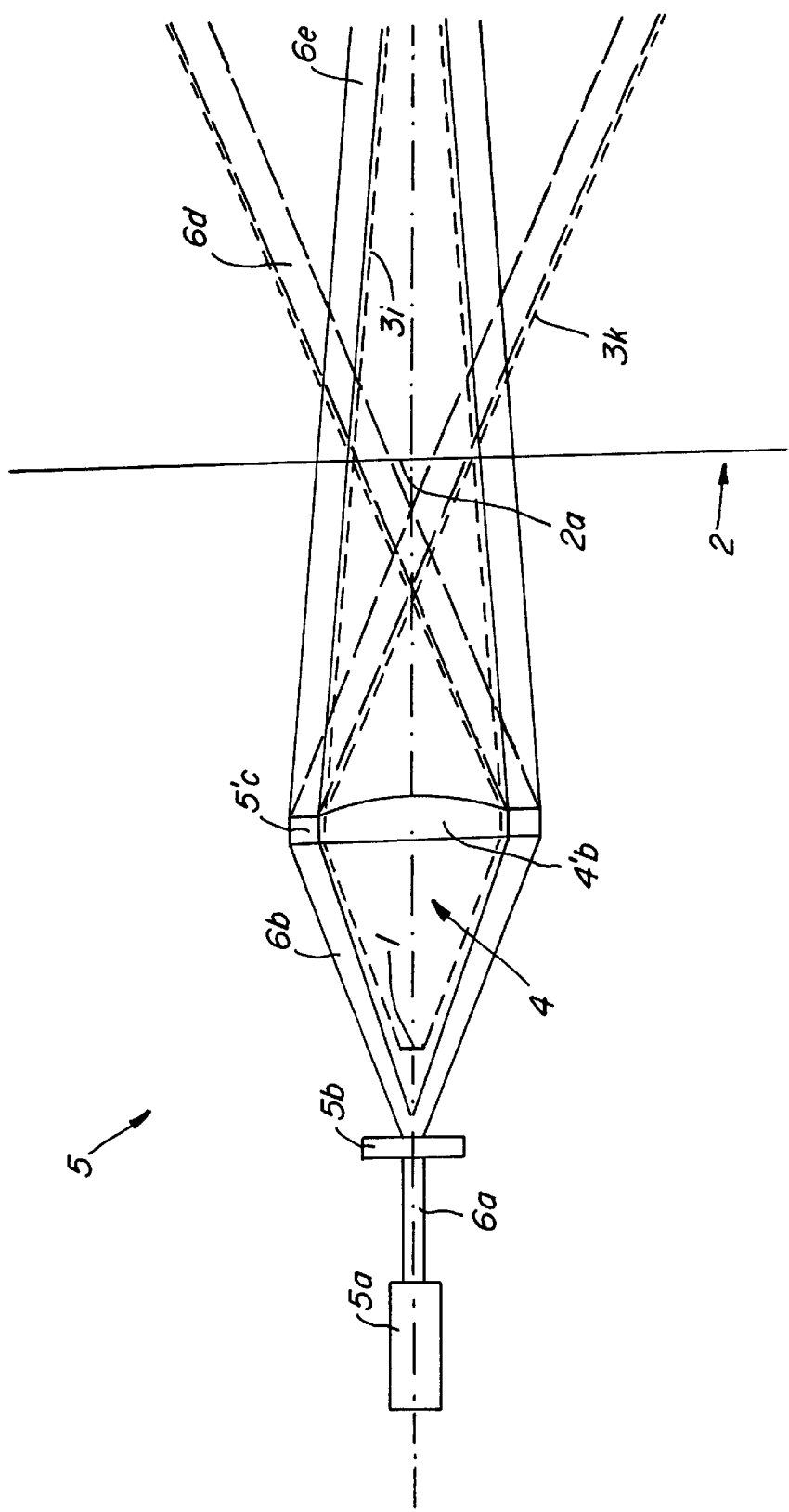
FIG. 5 shows a schematic representation of a device according to the invention for temperature measurement according to a fourth embodiment.

Whereas all the previously described embodiments related to distant-focussed systems, an embodiment is shown in FIG. 5 in which the shape of the measurement spot of a close-focussed system can be rendered visible with the aid of a diffractive optical system. In this case the measurement plane, i.e., the object of measurement 2, lies directly in the focus plane of the optical system 4. In each case two rays 3i, 3k delimiting the infrared beam are shown in the drawing. The ray 3i extends from the upper edge of the infrared lens 4'b to the upper edge of the measurement spot 2a or from the lower edge of the infrared lens 4'b to the lower edge of the measurement spot. By contrast, the ray 3k extends from the lower edge of the infrared lens 4'b to the upper edge of the measurement spot 2a or from the upper edge of the infrared lens 4'b to the lower edge of the measurement spot.

The optical element 5'c of the sighting arrangement 5 is designed so as to produce two intensity cones 6d and 6e which substantially follow the course of the marginal rays 3k and 3i. In this case the intensity cone 6e describes the size of the measurement spot as far as the focus plane and the intensity cone 6d describes the divergent measurement spot after the focus plane.

A disadvantage of this embodiment is that the intensity cone 6d extends inside the marginal ray 3k, whilst the intensity cone 6e extends outside the marginal ray 3i. However, this disadvantage can be overcome by another design of the refracting and/or reflecting optical element 5'c.

In the embodiment according to FIG. 5 the light intensity distribution could advantageously be formed by two circular concentric markings, wherein one circular marking identifies the measurement spot lying between the optical element 5'c and the focus plane and the other marking identifies the measurement spot lying behind the focus plane—when viewed from the optical element.

What is claimed is:

1. Device for temperature measurement comprising:
   a) a detector for receiving heat radiation (3) emanating from a measurement spot on an object of measurement;
   b) an optical system for imaging the heat radiation emanating from the measurement spot onto the detector;
   c) and a sighting arrangement comprising:
      a laser;
      a diffractive optical system, aligned to be illuminated by said laser, to produce a diffraction pattern in the form of light intensity distribution which includes a $0^{th}$ order point in the center of the measurement spot and at least one intensive circle displaced from the center; and
      an optical element, aligned to be illuminated by said intensive circle and said $0^{th}$ order point to position said intensive circle for identifying and outlining the position and size of the measurement spot on the object of measurement by means of visible light and for positioning the $0^{th}$ order point near the center of the measurement spot to facilitate sighting.

* * * * *